United States Patent [19]

Beneke

[11] Patent Number: 4,681,220

[45] Date of Patent: Jul. 21, 1987

[54] CONTAINER FOR AN OFFSHORE FISHING LURE

[76] Inventor: Robert G. Beneke, 11620 Wander La., Dallas, Tex. 75230

[21] Appl. No.: 824,379

[22] Filed: Jan. 31, 1986

[51] Int. Cl.$^4$ .............................................. A01K 93/00
[52] U.S. Cl. ................................ 206/315.11; 43/57.1; 43/25.2
[58] Field of Search ............... 206/315.11; 43/25.2, 43/54.1, 57.1

[56] References Cited

U.S. PATENT DOCUMENTS

| D. 217,663 | 5/1970 | Chamberlain | 43/25.2 |
|---|---|---|---|
| 742,040 | 10/1903 | Kurtz, Sr. | 206/315.11 |
| 2,699,623 | 1/1955 | Pragalz | 43/25.2 |
| 2,767,502 | 10/1956 | Reynolds | 43/54.1 |
| 2,791,054 | 5/1957 | Gronek | 43/25.2 |
| 3,057,464 | 10/1962 | Baggott, Sr. | |
| 3,062,475 | 11/1962 | Miller, Jr. | 43/54.1 |
| 3,142,931 | 8/1964 | Ulsh | |
| 3,213,564 | 10/1965 | Borell | |
| 3,224,134 | 12/1965 | Holcombe | 43/57.1 |
| 3,540,143 | 11/1970 | Zemba | 43/57.1 |
| 3,897,650 | 8/1975 | Pilston | |
| 4,383,385 | 5/1983 | Myers | 43/57.1 |
| 4,413,438 | 11/1983 | Hayne | 43/57.1 |

FOREIGN PATENT DOCUMENTS 732817  4/1966  Canada ............................. 43/25.2

Primary Examiner—Joseph Man-Fu Moy
Attorney, Agent, or Firm—Thomas L. Cantrell; Stanley R. Moore

[57] ABSTRACT

Disclosed is a container for an offshore fishing lure which contains an elongated cylinder sized in proportion to contain the lure within it. The cylinder is provided with a first end piece sized and proportioned to frictionally and removably to fit on one end of the cylinder to selectively substantially close that end. The first end piece is apertured as by slot, for admitting passage of a leader on an offshore fishing lure, the first end piece has a projection extending from a side. A second end piece is fitted on the other end of the cylinder, and it too has a projection extending from the side. The leader of the offshore fishing lure can be wrapped around the two projections for storage purposes. The container preferably apertured at the ends and sides for ventilation and drainage purposes and furthermore is preferably transparent so that its contents may be viewed.

7 Claims, 3 Drawing Figures

CONTAINER FOR AN OFFSHORE FISHING LURE

BACKGROUND OF THE INVENTION

In the pursuit of sport fish such as marlin, sailfish and tuna, it is common to employ sizable offshore fishing lures which generally include a head or body piece, streamers attached to the body piece, and one or more hooks also attached to the body piece or to a monofilament or steel leader. The body piece and streamers are crafted to resemble a small fish and thus to serve as a bait or lure for the sport fish enthusiast. Offshore fishing lures of this kind are normally attached to fishing lines by means of leaders, which are most often lengths of monofilament plastic line or steel cable.

In the course of a sport fishing excursion, it is normal to work several fishing poles at a time from the boat, and it is also normal to change lures repeatedly during the course of the excursion on each line, in an effort to use a lure from a selection which will succeed in attracting the sport fish. As a result of this activity the cockpit of a sport fishing boat tends to be cluttered or even littered with offshore fishing lures just taken out of use or just awaiting being put into use. This condition is unsightly, and even dangerous, since the lures have sizable hooks thereon. In addition loosely stored or casually stored offshore fishing lures and their accompanying leaders tend to become entangled with one another.

Various informal means have been devised for storing and handling offshore fishing lures of the sport fishing type, none of which has proved particularly satisfactory. In addition various types of bags, boxes and other containers have been employed with indifferent success.

SUMMARY OF THE INVENTION

In accordance with the invention there is provided a container for an offshore fishing lure which makes provision for storing a fishing lure in a neat, tidy and safe manner, with adequate ventilation and drainage, and with special provisions for stowing the leader portion of the lure. The container of the invention is convenient and easy to use.

In accordance with the broad aspects of the invention there's provided a container for an offshore fishing lure which includes an elongated cylinder sized and proportioned to contain the lure within it. A first end piece is provided which is sized and proportioned to removably fit on one end of the cylinder. The first end piece is apertured to admit passage of the leader on the lure from the inside of the container to the outside.

The container also has a second end piece fitted on the other end of the cylinder. The container is further provided with at least two axially spaced radially outwardly extending projections thereon for securing the leader on the exterior of the container by wrapping it between the projections.

Preferably the container has its projections mounted one on each of the above-mentioned end pieces.

Furthermore, it is preferred that the projections are each half-cleats and the half-cleats each have horns or turned portions projecting axially outwardly in opposite directions from each other to facilitate the wrapping of the leader thereon.

It is also preferred that the projections or half-cleats are in substantial arcuate alignment with each other, again to facilitate wrapping with the offshore fishing lure leader therebetween.

If desired the side wall of the cylinder may be apertured in one or more places for ventilation and drainage. Drainage and ventilation are both important for enhancing the life of the lures, since saltwater is somewhat corrosive to them. Furthermore, the second end piece may also be apertured for ventilation and drainage purposes. It is preferred that the cylinder of the container be substantially transparent so that a user may see the offshore fishing lure contained therein.

Among the objects of the invention are the provision of an offshore fishing lure container having the characteristics outlined above of being convenient, easy to use, economical in construction and providing for the safe and secure stowage of an offshore fishing lure.

The manner in which the foregoing objects, together with other objects and purposes, are achieved may best be understood from a consideration of the detailed description which follows, together with the accompanying drawings.

DETAILED DESCRIPTION OF A PREFERRED EMBODIMENT

Figure 1:
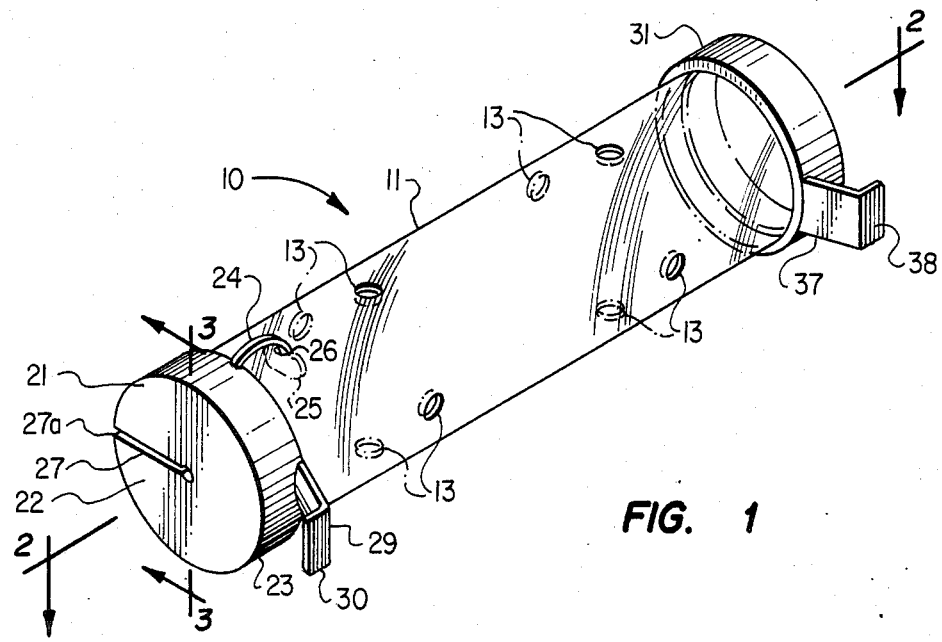
FIG. 1 is a perspective view of a container for an offshore fishing lure constructed in accordance with the invention.

In the drawings the offshore fishing lure container of the invention is designated generally as 10. It includes an elongated cylinder 11 sized and proportioned to contain an offshore fishing lure 12 within it. As indicated by the shading on FIG. 1, the cylinder is preferably transparent so that the contents within it can be observed. The cylinder is preferably apertured as at 13 to provide for both ventilation and drainage.

Although the container of the invention can accommodate many different types of offshore fishing lures, the offshore sport fishing lure 12 illustrated in the drawings includes a head 14, which is decorated with an eye 15. Attached to the head are streamers 16, which are often colored. Hidden among the streamers and firmly attached to head 14 are fish hooks 17, each equipped with a barb 18. Attached to the lure is a leader 20, which is preferably made of monofilament.

Figure 2:
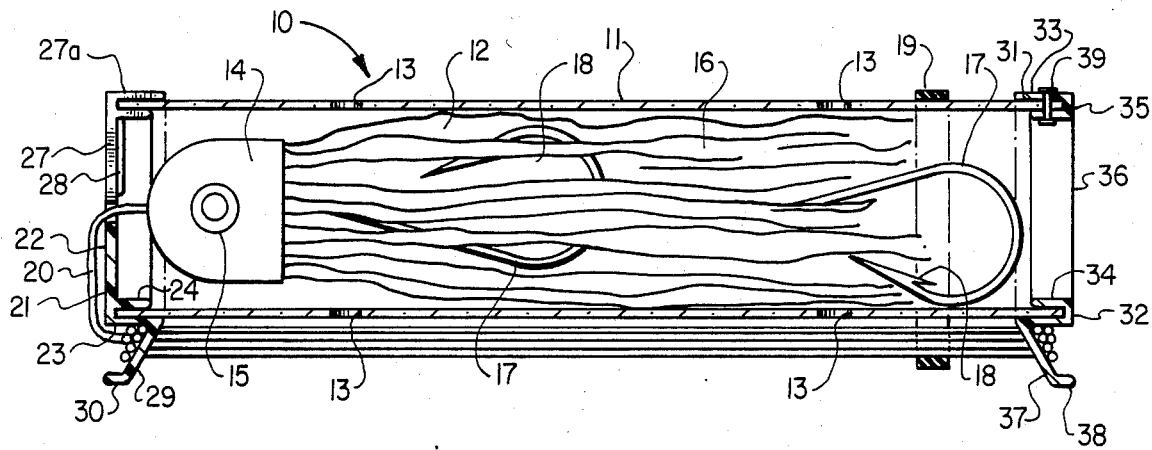
FIG. 2 is a cross-sectional plan view of the offshore fishing lure container of FIG. 1, the section being taken on the line 2—2 of FIG. 1, the FIG. further being drawn to show an offshore fishing lure contained within the unit.
Figure 3:
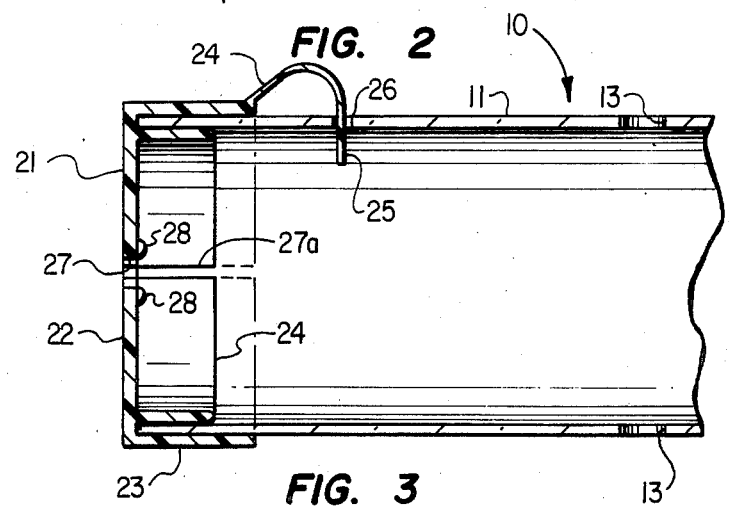
FIG. 3 is a fragmentary sectional elevational view of the container of FIG. 1, the section being taken on the line 3—3 of FIG. 1.

At one end of cylinder 11 there is mounted a first end piece 21 which is sized and proportioned to frictionally and removably fit on the end of the cylinder. When it is removed from the end, access to the interior of the cylinder is provided for insertion of and removal of an offshore fishing lure. In use, it is preferred that the leader end of the offshore fishing lure, or the head end be positioned adjacent end cap 21. End cap 21 has a face 22 and a generally cylindrical depending closure fit 23 as can best be seen in FIG. 3. As can best be seen in FIG. 2 end cap 21 also is preferably provided with an internal generally cylindrical depending skirt 24 which cooperates with the external skirt 23 and the end of cylinder 11 to provide a closure fit of the end of the cylinder.

A lanyard 24 (see FIG. 1) is preferably integrally formed on the skirt 23 of end piece 21, to provide for securing the first end piece to cylinder 11 even when the first end piece is removed from closing one end of the cylinder. For this purpose lanyard 24 ends in an enlarged head 25 which is snap-fitted through an opening 26 is cylinder 11. In this manner, end piece 21 can be removed from cylinder 11 to provide access for placing a lure in the container or removing it out of the container without the end piece becoming separated from the container by any great distance, thus obviating the danger that the end piece may become lost.

End piece 21 is provided with a radially extending slot 27 in the face thereof. The purpose of slot 27 is to admit passage of leader 20 therethrough so that the leader of the lure 12 in the container may be accommodated exteriorly of the container in a manner to be described here and below. Preferably the slot 27 includes a portion 27a which extends through depending skirt 23, and internal depending skirt 24, so that the leader may be lead into and out of slot 27 from the side, if desired. Slot 27 extends preferably from the margin of face 22 to the center of that face. Preferably a reinforcing rib 28 is provided on either side of slot 27 on the underside of face 22 to reinforce and strengthened face 22 in the neighborhood of slot 27.

First end piece 21 is provided with a radially outwardly extending projection 29 which is itself provided with a horn 30 that projects axially outwardly so that the two parts 29 and 30 together form a half-cleat.

At the other end of cylinder 11 there is provided a second end piece 31 which has a face 32, an external depending cylindrical skirt 33, and an internal depending cylindrical skirt 34 for fitting attachment onto the other end of cylinder 11. The face 35 of end piece 31 has apertures, as at 36 to provide for ventilation and drainage.

Like the first end piece, second end piece 31 is provided with a radially outwardly extending projection 37 terminating in a horn 38 so that projection 37, and its horn 38 taken together form a half-cleat in which the horn 38 projects axially, outwardly in a direction opposite to the axially outward projection of horn 30. The leader 20 of the offshore fish lure 12 is wrapped between the two half-cleats formed by projections 29 and 37 and is confined thereon by the horns 30 and 38. The leader may be secured in its wrapped position by rubber or elastic band 19 extending around cylinder 11. Band 19 may also be stored on cylinder 11 when it is not in use.

It is preferred that half-cleats formed by projections 29 and 37 be maintained in substantial arcuate alignment with each other when the first end piece is in position closing the one end of the cylinder. The approximate arcuate position of the projection 29 with respect to the cylinder is more or less fixed by lanyard 24, at least within a few degrees. For the same purpose, plastic rivet 39 is used to fix second end piece 31 against rotation on cylinder 11 to thereby fix the arcuate position of projection 37. Alternately the end piece 31 may be cemented to the cylinder 11. Thus, by positioning the projection 37 at the desired arcuate location, before applying plastic rivet 39 to fix end piece 31 to cylinder 11 one can establish and maintain a basic alignment in the arcuate sense between projections 29 and 37.

As indicated by the cross-hatching in the drawings, the preferred materials of construction for the container of the invention are plastics. These are particularly desirable because of their good inherent resistance to the corrosive effects of seawater.

From the foregoing it can be seen that the present invention provides an offshore fishing lure container and in particular, such a container adapated for use with the sort of lures employed in offshore sport fishing which is convenient and effective for protecting and accommodating offshore fishing lures safely.

What is claimed is:

1. A container for an offshore fishing lure and leader secured thereto, said container comprising:

an elongated cylinder sized and proportioned to contain said lure there within and said leader outside thereof in securement thereto;

first and second end pieces fitted on the ends of said cylinder;

said first end piece being sized and proportioned to frictionally and removably fit on one end of said cylinder to selectively substantially close said end and contain said lure within said cylinder;

said first end piece having a face and a generally depending cylindrical skirt sized to engage said cylinder in frictional securement thereto;

said first end piece having a slot through said face and said skirt thereof for admitting passage of said leader on said offshore fishing lure;

means for securing said leader to said container with said lure container therein;

said leader securing means comprising a first half-cleat projecting from said first end piece at a side thereof, and a second, oppositely disposed half-cleat projecting from said second end piece at a side thereof, each said half-cleat including a horn and said horns of said oppositely disposed half-cleats extending axially outwardly from said cylinder in opposite directions when said first end piece is fitted on said cylinder; and means for maintaining said oppositely disposed half-cleats in substantially arcuate alignment with each other when said first end piece is substantially closing said one end of said cylinder for facilitating alignment and wrapped securement of said leader around said half-cleats.

2. A container in accordance with claim 1 in which said slot through the face of said first end piece extends through the skirt of said flat piece for admitting said leader into said slot from the side of said first end piece.

3. A container in accordance with claim 1 and further comprising attachment means securing said first end piece and said cylinder together even when said first end piece is removed from closing said one end of the cylinder.

4. A container is accordance with claim 1 and further comprising at least one aperture in the side wall of said cylinder for ventilation and drainage.

5. A container in accordance with claim 1 in which said second end piece has a face and a generally depending cylindrical skirt.

6. A container in accordance with claim 5 in which the face of said second end piece is apertured for ventilation and drainage.

7. A container in accordance with claim 1 in which said cylinder is substantially transparent for admitting a view of its contents.

* * * * *